(12) United States Patent
Alesi et al.

(10) Patent No.: US 7,944,834 B2
(45) Date of Patent: May 17, 2011

(54) POLICING VIRTUAL CONNECTIONS

(75) Inventors: Vincent A. Alesi, Yorktown Heights, NY (US); William A. Bjorkman, Danbury, CT (US); Roman M. Krzanowski, White Plains, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 553 days.

(21) Appl. No.: 11/588,980

(22) Filed: Oct. 27, 2006

(65) Prior Publication Data

US 2007/0206501 A1    Sep. 6, 2007

Related U.S. Application Data

(60) Provisional application No. 60/778,920, filed on Mar. 6, 2006.

(51) Int. Cl.
*H04L 12/26*        (2006.01)

(52) U.S. Cl. ......... 370/235; 370/229; 709/223; 709/226
(58) Field of Classification Search .................. 370/229, 370/235; 709/225, 226
See application file for complete search history.

(56) References Cited

U.S. PATENT DOCUMENTS

| | | | |
|---|---|---|---|
| 7,190,696 B1 * | 3/2007 | Manur et al. | 370/392 |
| 7,266,122 B1 * | 9/2007 | Hogg et al. | 370/395.41 |
| 7,499,458 B2 * | 3/2009 | McDysan et al. | 370/396 |
| 2002/0036984 A1 * | 3/2002 | Chiussi et al. | 370/232 |
| 2002/0191543 A1 * | 12/2002 | Buskirk et al. | 370/230.1 |
| 2004/0037306 A1 * | 2/2004 | Khan et al. | 370/437 |
| 2004/0202166 A1 * | 10/2004 | Dillon | 370/392 |
| 2005/0117576 A1 * | 6/2005 | McDysan et al. | 370/389 |
| 2005/0163048 A1 * | 7/2005 | Arora et al. | 370/230 |

* cited by examiner

*Primary Examiner* — William Trost, IV
*Assistant Examiner* — Charles C Jiang

(57) ABSTRACT

Traffic flow is monitored in a plurality of links. Based on the monitoring, a manner in which traffic is allocated to the links is determined, and at least one policer is assigned according to the manner in which traffic is allocated to the links.

16 Claims, 3 Drawing Sheets

POLICING VIRTUAL CONNECTIONS

This application claims priority to U.S. provisional patent application Ser. No. 60/778,920, filed Mar. 6, 2006, which provisional application is hereby incorporated by reference herein in its entirety.

BACKGROUND INFORMATION

Various forms of redundant access to packet switched networks such as Ethernet networks are presently known and used. Two or more network links are generally required to provide redundancy, and increased bandwidth capacity, between an Aggregation Access Element (AAE) and a Customer Equipment (CE). In some cases, the redundant links can appear on multiple AAEs. As network demands grow, there is likewise increasing demand for redundant access to packet switched network-based services.

Present ways of providing redundant access in a packet switched network include technologies such as Link Aggregation (LA) and/or Multiple Spanning Tree (MST) heuristics. Accordingly, traffic related to a given Virtual Connection (VC) can be distributed across more than one link, e.g., as is presently done when using Link Aggregation, or traffic for a given VC can be confined to a single link, e.g., as is presently done when using multiple spanning tree technology. A Load Sharing Algorithm (LSA) specific to the technology for redundant access, e.g., link aggregation or multiple spanning tree, is used to determine which packets are put onto which links.

Where link aggregation is used, a different load sharing algorithm may be used at the aggregation access element and the customer equipment for each direction of transmission. In other words, the load sharing algorithm used at the two ends of a transmission, e.g., AAE and CE, may be completely independent, i.e., there is no attempt to coordinate the load sharing algorithm at the two ends.

One example of a widely deployed load sharing algorithm today is the use of a hash function on the combination of the Media Access Control (MAC) Destination Address (DA) and/or Source Address (SA) of each Ethernet frame entering a Link Aggregation Group (LAG). Such MAC addresses are completely independent of the Virtual Connection Identifier (VCID) associated with a VC. A VCID typically uses a Virtual Local Area Network (VLAN) Identifier, sometimes referred to as a VID, to uniquely identify the VC. Thus, the load sharing algorithm may well result in different frames of the same VID being sent on different physical links in the link aggregation group.

The assignment of traffic to links based on a load sharing algorithm is not deterministic, i.e., the aggregation access element cannot predict on which link or links the traffic related to a given VC is carried at a particular interval in time. For example, a customer may have ordered 4 Mbps (megabits per second) of "Gold" service and, at 10:00 AM local time, 100% of the traffic on a given VC could appear on a first link, and at 10:01 AM local time, 25% of the traffic could appear on a second link and the other 75% of the traffic on a third link. However, policing at the aggregation access element is required to limit the rate of service traffic allowed into the packet switched network to the contracted rate for the service.

Current systems and methods for policing traffic over a VC use either a centralized or a distributed approach. The centralized approach typically uses a policer implemented per switch for all links on the aggregation access element. While this approach might be well suited for policing a given VC that is spread across multiple links, the drawback to a centralized policing architecture is that policing resources in a given switch are limited. For example, if an aggregation access element needs to police traffic for tens of thousands of services, a centralized architecture cannot work.

A distributed policing architecture typically uses policers associated with each link on an aggregation access element. This approach is required in large scale networks. While using dedicated policers per link solves the scalability issue, there is currently no effective technology available to coordinate the distributed policing of a given service that is spread across multiple links.

For the case where a given VC is spread across multiple links, a simple approach is to configure a policer on each link for the full value of the contracted bandwidth. This allows the customer to at least get his contracted bandwidth even if the traffic is confined to a single link. Re-consider the example briefly discussed above, where 4 Mbps of "Gold" service is dynamically spread across multiple (say 4) links. A 4 Mbps policer configured on each link would allow the customer to send at least 4 Mbps into the network at all times, but at any given point in time, the rate could go up to 16 Mbps. This could create unfair policies across customers and result in performance problems within the network. In addition, the lack of good bandwidth management results in poor utilization of the group of links, effectively reducing the capacity of the group to the capacity of a single link as is discussed further in the next paragraph. If, on the other hand, a 1 Mbps policer is configured on each of the four links, a customer having contracted for "Gold" service could possibly get only 1 Mbps through the network, at times when a load sharing algorithm is pushing all traffic onto just one link. This situation is unfair to the customer.

For the case where a given VC is confined to a single link, the situation is a bit simpler, but the AAE still cannot predict which of the links would be used at any given point in time. In this scenario, a full-rate policer could be configured on each link in the group, and the customer's traffic would be limited to the contracted rate. However, this results in inefficient utilization of the links, since admission control is typically tied to the policer rate. In the above example, each link would need to allow for 4 Mbps "Gold" service, which could appear on a first link at 10:00 AM local time and on a third link at 10:02 AM. The result is that the group of four links can only be provisioned as if it were the capacity of a single link. This is very inefficient.

DETAILED DESCRIPTION OF THE PREFERRED EMBODIMENTS

Figure 1:
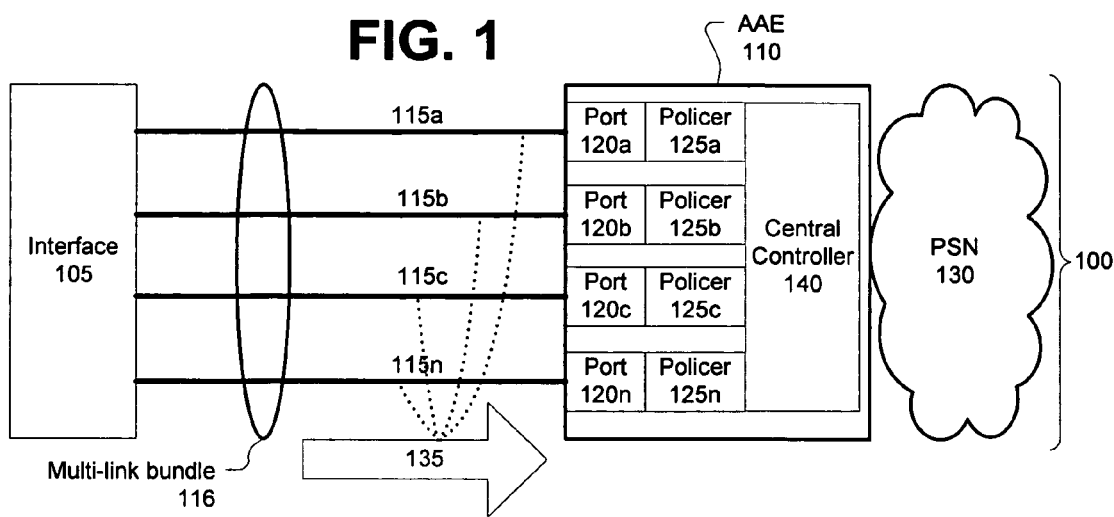
FIG. 1 illustrates an example of policing of distributed traffic flows in a packet switched network.

FIG. 1 illustrates an exemplary system 100 for policing of distributed traffic flows in a packet switched network. Network traffic is illustrated in FIG. 1 as flowing from left to right. An interface 105 may be a customer equipment (CE) or the like that includes Ethernet bridges and routers and the like for sending network traffic toward an aggregation access element (AAE) 110 via one or more network links 115 in a multi-link bundle 116. Using one or more of the links 115, a virtual connection 135 may be established between interface 105 and aggregation access element 110, whereby a customer is provided access to packet switched network 130. Packet switched network 130 may include the Internet and may use known protocols such as transfer control protocol/internet protocol (TCP/IP).

Aggregation access element 110 includes one or more input/output ports 120 and one or more policers 125 associated with each of the ports 120. Aggregation access element 110 is known for including hardware and software for providing a single logical link, or virtual connection (VC) 135, that uses multiple physical links 115, thereby aggregating data received over links 115 and for providing access to packet switched network 130. Aggregation access element 110 can be an Ethernet switch, MultiProtocol Label Switching (MPLS) switch, IP router, etc. Policer 125 is typically implemented in a customized hardware component of a network element, e.g., a network processor or application specific integrated circuit (ASIC) implemented as part of an input/output module of a switch or router.

Coupling policing per VC 135 to one or more links 115 can be achieved by implementing methods and systems within aggregation access element 110. For example, aggregation access element 110 may include a central controller 140, which in turn may include a processor, a memory, computer-readable storage media including computer-executable instructions, etc. Computing devices such as central controller 140 may employ any of a number of operating systems and other software known to those skilled in the art. Central controller 140 is generally included within aggregation access element 110, but in any event is associated with aggregation access element 110 such that controller 140 is able to communicate with aggregation access element 110. For example, central controller 140 may reside in a network processor or may be an ASIC component inside a common control card of a switch or router.

Computing devices such as those included within aggregation access element 110, for example, central controller 140, generally include instructions executable by the computing device and stored on a computer-readable medium included within or connected to the computing device. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

For cases where VC 135 is confined to a single link in a group, various embodiments provide for dynamically assigning policer 125 to a link 115 in a multi-link bundle 116 that is presently providing a given VC 135, even in the case where the number of links 115, and hence the link assignment, is dynamically changing, e.g., due to link failure, load balancing, etc.

In one embodiment, a policer 125 is dynamically assigned to a link 115 using a new signaling protocol or extensions to an existing signaling protocol. For example, extensions may be made to the known Link Aggregation Control Protocol (LACP) included in standard 802.3-2005, Clause 43, published by the Institute of Electrical and Electronics Engineers (IEEE) of New York, N.Y. Regardless of whether a new or existing signaling protocol is used, the signaling protocol must include a way to identify the manner in which a VC 135 is assigned to links 115 in multi-link bundle 116 i.e., to confirm that links 115 are associated with VCs 135 on a per-VC basis, that is, that VC 135 only uses a single link 115 that is dedicated to the VC 135. Further, the signaling protocol must be able to provide the link 115 identifier used for a given VC 135.

The signaling protocol must also be able to provide details concerning the load sharing algorithm that is being used, that is, details concerning how VC 135 is allocated to link 115. An example of a load sharing algorithm that performs this distribution is modulo operation, where the VID of VC 135 is divided by the number of active links in multi-link bundle 116. The remainder of this division process determines the link assignment. For example, if the VC is assigned a VID of ninety-nine (99) and is assigned to a bundle 116 of four links 115, modulo operation would be as follows: 99 divided by 4 results in a remainder of 3, therefore a one of the four links 115 associated with the number 3 would be selected for use by VC 135.

One possible mechanism for extending LACP is to use part of the presently existing fifty byte 'Reserved' field specified in the protocol to add the following fields: "link identifier," "link state," and "heuristic identifier."

The link identifier field generally consumes four bits. This field identifies a specific link 115 within multi-link bundle 116 that is used for the purposes of load sharing. For example, if a fourth link 115 is added in a bundle 116, the link identifier field is used to identify the added link 115 as link number 3 (links 115 numbered 0, 1 and 2 having already been assigned). It will be appreciated that providing four bits in the link identifier field allows for up to sixteen links 115 in a bundle 116, which as a practical matter is generally more than sufficient.

The link state field generally consumes one bit, and provides a flag indicating "active" or "stand-by" status for a link 115. That is, the link state field identifies a specific link 115 as either active, i.e., capable of assigning traffic, or stand-by, i.e., not used for assignment, but used in case an active link 115 fails.

The heuristic identifier field generally consumes three bits. This field identifies the heuristic used for load distribution as discussed above. The allotted three bits allow for up to eight different load sharing heuristics to be identified, generally more than may be found in a practical implementation. Examples of possible load sharing heuristics include "modulo operation based on number of links," "all to one mapping," "manual provisioning," and "non-VLAN based provisioning."

A "modulo operation based on number of links" heuristic divides the VLAN ID for a given VC 135 by the number of active links 115 in a bundle 116. The remainder determined by this division operation determines the assignment of a link 115 to a VC 135. To amplify on the example of a modulo operation provided above, if four links (numbered 0, 1, 2, 3) are used in bundle 116, and a VLAN ID for VC 135 is 99, then ninety-nine divided by four yields a remainder of three, which results in the link 115 associated with the number three being assigned to VC 135.

All to one mapping forces all VCs 135 to a single active link 115 in a bundle 116. Note that this heuristic is only applicable to bundles 116 including two links 115. For example, an active link 115 would carry all traffic, and a stand-by link 115 would be used for back-up purposes, in case the active link 115 fails.

Manual methods are known to allow manual provisioning of a given VLAN ID to a specific link.

Non-VLAN based heuristics can be used to indicate that a load sharing algorithm is not based on a VLAN ID, so a given flow may be distributed equally across links 115 in a bundle 116.

Figure 2:
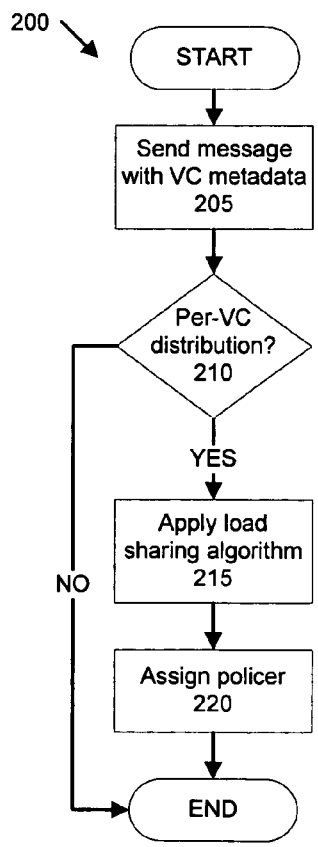
FIG. 2 illustrates an exemplary process for dynamically assigning a policer to a link in a multi-link bundle.

FIG. 2 illustrates a process 200 for dynamically assigning a policer 125 to a link 115 in a multi-link bundle 116.

In step 205, interface 105 sends a message to aggregation access element 110, e.g., to central controller 140, according to a signaling protocol that includes metadata for VC 135 discussed above for identifying the manner of distributing VC 135 to links 115, providing a link 115 identifier, details concerning a load sharing algorithm, etc.

Next, in step 210, central controller 140 receives the message sent in step 205 and determines whether the VC 135 associated with the message is distributed by interface 105 to a link 115 on a per-VC basis. If not, process 200 ends. Otherwise, process 200 proceeds to step 215.

In step 215, central controller 140 uses information included in the message sent in step 205 to determine the load sharing algorithm being used to allocate the VC 135 associated with the message to a link 115.

Next, in step 220, central controller 140 applies the load sharing algorithm determined in step 215 to assign a policer 125 to the link 115 being used by VC 135.

Following step 220, process 200 ends.

According to process 200, policer 125 is used to ensure that the rate of transmission of data through VC 135 from interface 105 to aggregation access element 110 is limited to a predetermined rate, e.g., a rate contracted for by a user or owner of interface 105. Policer 125 is thereby used to ensure that the amount of data provided from DC 130 52 packet switched network 130 is appropriately limited. Similarly, policer 125 may be used to ensure that the rate of transmission of data through VC 135 from aggregation access element 110 to interface 105 is limited to a predetermined rate.

Figure 3:
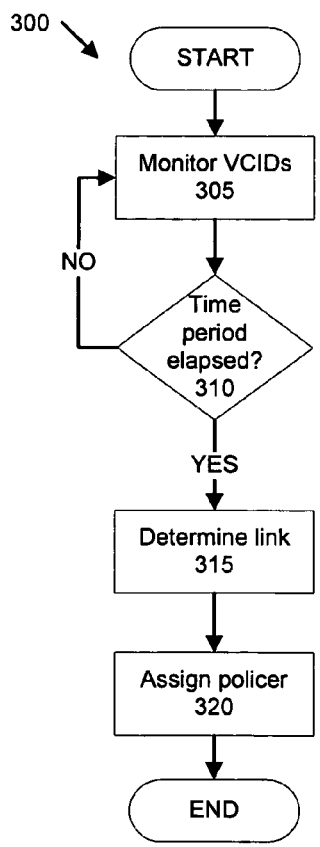
FIG. 3 illustrates an exemplary process for monitoring link traffic and assigning a policer to a link determined to be associated with a virtual connection.

In some embodiments, aggregation access element 110, e.g., central controller 140, monitors traffic flow on each link at 115 to determine which link 115 is being used for a given VC 135, and to assign a policer 125 to the link 115 accordingly. FIG. 3 illustrates an exemplary process 300 for performing such monitoring traffic on links 115 and assigning a policer 125 to a link 115.

In step 305, aggregation access element 110, e.g., central controller 140, monitors the VCIDs or VIDs as appropriate, VIDs being monitored in the case where Ethernet is used, of every packet on each link 115 and multi-link bundle 116 for a specified time period, e.g., ten milliseconds. In performing this monitoring, central controller 140 maintains a record of each instance in which a VCID or the VID is associated with a particular link 115.

Next, in step 310, it is determined whether the specified period of time has elapsed. If not, process 300 returns to step 305. Otherwise, process 300 proceeds to step 315.

In step 315, central controller 140 determines the link associated with a virtual connection 135 according to the monitoring performed in step 305. That is, central controller 140 analyzes the record or records stored in step 305 to determine the link 115 associated with each VCID or VID identified in step 305.

Next, in step 320, central controller 140 assigns a policer 125 to the Port 120 receiving the link 115 associated with the VC 135 identified by the relevant VCID or VID identified in step 305.

Following step 320, process 300 ends.

It should be understood that process 300 can succeed in identifying the link 115 associated with a given virtual connection 135 only if aggregation access element 110, e.g., central controller 140, in addition to interface 105, is configured to perform per-VC assignment of links 115. Otherwise, process 300 can at most be used to limit the rate of data transmitted from interface 105 to aggregation access element 110, but will not be able to identify a link 115 used by VC 135 to transmit data from aggregation access element 110 to interface 105, and therefore a policer 125 cannot be deployed to police traffic on such a link 115.

Figure 4:
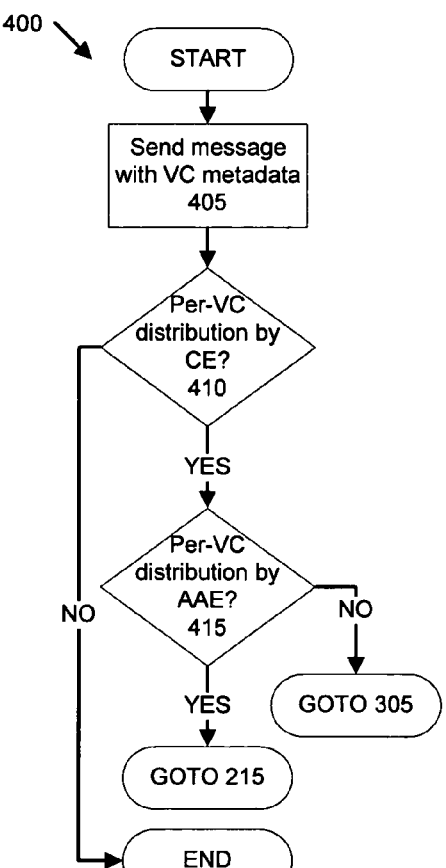
FIG. 4 illustrates an exemplary process for selecting and then using a way of assigning a policer to a link.

FIG. 4 illustrates an exemplary process 400 that incorporates and combines steps from processes 200 and 300 to select and then uses a way of assigning a policer 125 to a link 115.

In step 405, much as in step 205 discussed above with reference to FIG. 2, interface 105 sends a message to aggregation access element 110, e.g., central controller 140, according to a signaling protocol that includes metadata for VC 135 discussed above for identifying the manner of distributing VC 135 to links 115, providing a link 115 identifier, details concerning a load sharing algorithm, etc.

Next, in step 410, much as in step 205 discussed above with reference to FIG. 2, central controller 140 receives the message sent in step 205 and determines whether the VC 135 associated with the message is distributed by interface 105 to a link 115 on a per-VC basis. If not, process 400 ends. Otherwise, process 400 proceeds to step 415.

Next, in step 415, central controller 140 determines whether it is configured to allocate links 115 on a per-VC basis. If so, process 400 essentially merges with process 200, beginning with step 215. If not, process 400 essentially merges with process 300, beginning with step 305.

For cases where VC 135 is spread across more than one link 115 in a bundle 116, the problem of managing VC 135 bandwidth is more complex. Traffic from a customer VC 135 may be distributed across several links. Flow allocation is generally based on the known link aggregation hashing methodology or some other explicit policies that may be implemented within aggregation access element 110. For example, policies in addition to MAC-based hashing include hashing based on IP SA/DA address pairs or a transport control protocol/uniform datagram protocol (TCP/UDP) port number. In addition, Multiple Spanning Trees could be used to assign VLAN IDs to different physical links. A sub-flow for VC 135 may then be any combination of layer 2 or layer 3 networking protocol headers or higher. Because data traffic rates are contracted for on a per-VC and not a per-flow basis, it is not possible to simply assign a single VC policing rate to all flows within a bundle 116 equally. Further, traffic flows within a bundle 116 may fluctuate, i.e., as explained above, there is no a priori knowledge concerning how the bandwidth assigned to a VC 135 will be split across links 115 at any given moment.

Figure 5:
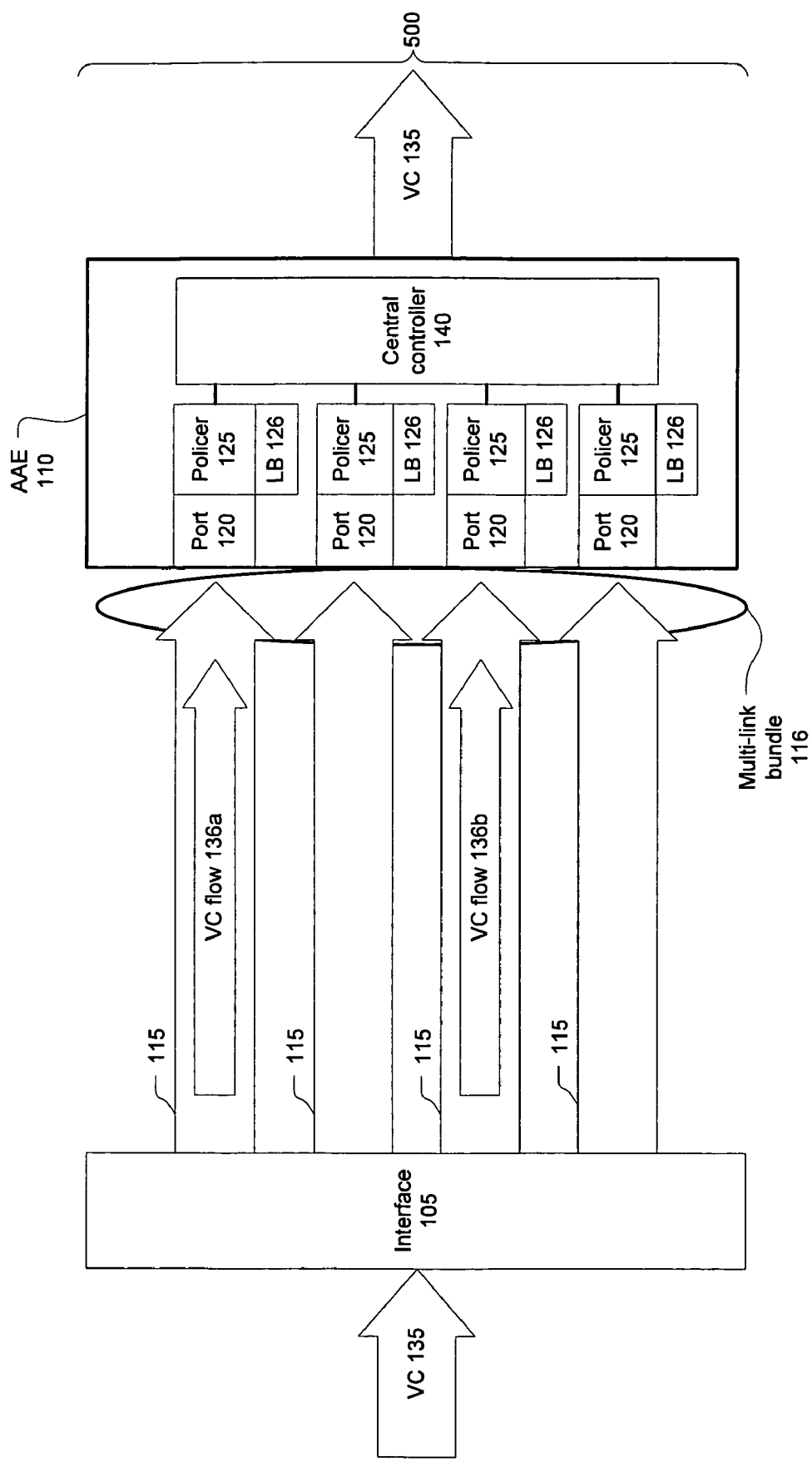
FIG. 5 illustrates an exemplary system for providing dynamic hierarchical policing.

Dynamic multilink policing addresses situations such as the foregoing. FIG. 5 illustrates an exemplary system 500 for providing dynamic multilink policing. System 500 bears similarities to system 100 discussed above, and it may be observed that systems 100 and 500 include a number of common elements. However, system 500 illustrates VC flows 136a and 136b traversing multiple links 115 in multi-link bundle 116, as is discussed further below.

As illustrated in FIG. 5, VC 135 enters interface 105, and is distributed over one and generally more links 115 as VC flows 136a, 136b, etc. VC flows 136 include data packets being transmitted over VC 135, such data packets being distributed to various links 115 according to the link aggregation hashing methodology or other policies mentioned above. FIG. 5 shows VC flows 136a and 136b traveling over to links 115, but it is to be understood that VC flows 136 may use none, some, or all of the links 115 in a bundle 116. Dynamic multilink policing generally means that each link policer 125 polices a VC flow 136 that appears on its associated link 115.

Policers 125 included in system 500 are each dedicated to respective links 115 and selectively communicate with a central controller 140, and police the flow of data traffic according to the combination of a per-link 115 and per-flow 136 basis as described further below. Central controller 140 is essentially a virtual policer, that is, central controller 140 is not an item of hardware physically associated with a link 115, but rather is provided at least partly in software or firmware to monitor and communicate with policers 125. As noted above, physical hardware associated with central controller 140 may include aggregation access element 110. Policers 125, in contrast, include physical hardware associated with links 115. A main role of central controller 140 in the case where VC 135 uses multiple links 115 is to keep a current status of the level of tokens for a given VC 135 and to distribute this token status information to all policers 125 associated with links 115 carrying a VC flow 136 for a given VC 135. Dynamic multilink policing is sometimes also referred to as dynamical hierarchical policing because controller 140 effectively has a hierarchical relationship over policers 125. The functions of both central controller 140 and policer 125 with respect to dynamic multilink policing will be explained further with reference to FIG. 6 below.

A link buffer 126 is associated with each policer 125 for storing packets following analysis by the policer 125, which controls whether a packet is placed in buffer 126 as well as whether a packet is allowed to leave buffer 126. In an embodiment, the size of link buffer 126 is the size of the largest expected packet size. This is sometimes referred to as the Maximum Transmission Unit (MTU) size. Following policing, as illustrated in FIG. 5, VC flows 136 are recombined into VC 135, and VC 135 exits aggregation access element 110.

Figure 6:
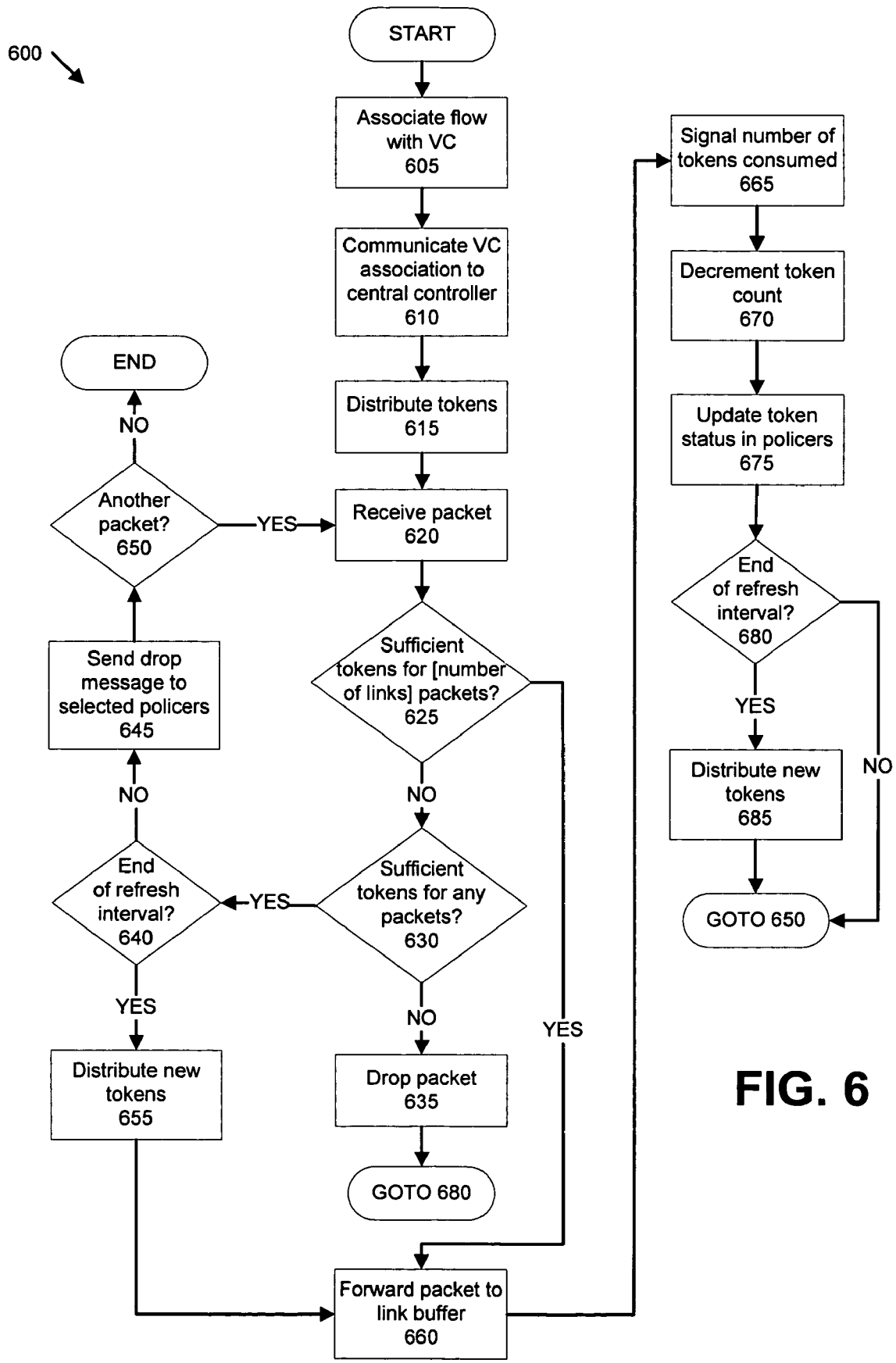
FIG. 6 illustrates an exemplary process for dynamic multilink policing.

FIG. 6 illustrates an exemplary dynamic multilink policing process 600.

In step 605, a policer 125 identifies a flow of packets as belonging to a given VC 135 according to one of the methods described above, e.g., a signaling protocol, a learning process, or a combination thereof. Alternatively, policer 125 may be preconfigured for one or more VCs 135.

Next, in step 610, the policer 125 sends a message to central controller 140 signaling that it is associated with a particular VC 135, e.g., by providing an identifier for the VC 135. Alternatively, central controller 140 may be preconfigured with information concerning the association of a policer 125 with a given VC 135. In any event, central controller 140 maintains a table or the like that associates policers 125 with a given VC 135.

Next, in step 615, central controller 140 provides tokens to all policers 125 that have been determined to be associated with a particular VC 135, e.g., as described above with respect to step 610. In a preferred embodiment, all policers 125 associated with a particular VC 135, as well as central controller 140, generally have the same number of tokens for the VC 135 at any given time. A token is simply an item of information indicating to policer 125 that sufficient bandwidth is available to VC 135 to allow passage of generally one but possibly more packets provided through VC flow 136. Therefore, in addition to the table mentioned above with respect to step 610, central controller 140 also generally has stored and associated with the VC 135 a Committed Information Rate (CIR), i.e., the amount of bandwidth that the VC 135 is permitted to consume, the CIR generally being determined according to a contract between a user and a network provider. The refresh rate, or refresh time interval, according to which central controller 140 distributes tokens to policers 125 is directly proportional to the Committed Information Rate (CIR) bandwidth of VC 135. For example, assume a CIR of one megabit per second (Mbps), a refresh interval of one millisecond, and further assume that one token is needed for policer 125 to pass each bit. In this example, one thousand tokens are added to a token bucket in policer 125 every millisecond. If the CIR was two Mbps, then two thousand tokens would be added each millisecond.

Next, in step 620, a policer 125 associated with VC 135 receives a packet through VC flow 136.

Next, in step 625, policer 125 determines whether it has stored a number of tokens for the VC 135 equal to the number of links being used by the VC 135. If not, process 600 proceeds to step 630. However, if policer 125 does have stored a number of tokens for the VC 135 equal to the number of links being used by the VC 135, then process 600 proceeds to step 660. The number of links being used by the VC 135 associated with the VC flow 136 providing the packet received in step 620 may be pre-stored in policer 125, or maybe provided in a message formatted according to a signaling protocol.

Alternatively, in step 625, policer 125 may simply determine whether it has stored enough tokens for the VC 135 to allow two packets in VC flow 136 to be transmitted over the link 115 being monitored by the policer 125. If so, process 600 may proceed to step 630; otherwise, process 600 may proceed to step 660.

In step 630, policer 125 determines whether it has sufficient tokens for VC 135 to allow any packets at all in VC flow 136 to be transmitted over the link 115. If not, process 600 proceeds to step 635. Otherwise, process 600 proceeds to step 640.

In step 635, policer 125 causes the packet received in step 620 to be dropped, thereby preventing the packet from exiting aggregation access element 110, i.e., from continuing to be transmitted through VC 135. Step 680 is executed following step 635.

In step 640, policer 125 sends to controller 140 a message known as a status message that inquires as to whether the end of a refresh interval has been reached. A status message at a minimum includes an amount of tokens presently available for the VC 135 and an index or other identifier sufficient to identify the policer 125 sending the status message. Upon sending the status message, policer 125 waits to receive from controller 140 either a message to drop packets in VC 135, known as a drop message, or a refresh message, i.e., a distribution of new tokens for VC 135. Accordingly, upon receiving the status message, central controller 140 determines whether the end of a refresh interval has been reached. If so, step 655 is executed next. Otherwise, step 645 is executed next.

In step 645, if the end of a refresh interval does not coincide with the receipt of the status message sent in step 640, then central controller 140 sends a drop message to selected policers 125. For example, in an embodiment, central controller 140 arbitrarily selects the policers 125 in order to restrict VC flow 136 to the contracted rate for VC 135. In this embodiment, a central controller 140 drop message is sent to each of the policers 125 required to drop its present packet for VC 135. The format of a drop message may vary by implementation; generally a drop message contains only a coded request to drop packets in buffer 126.

The amount of time that it takes for a policer 125 to send a status message, and for central controller 140 to process the status message and to respond to one or more policers 125 with a drop message, should be less than the time spent by a packet in buffer 126. This amount of time is specific to particular implementations. Although not illustrated in FIG. 6, in general if a given packet has remained in a buffer 126 for the required time without receipt of a drop message by the associated policer 125, the packet will be forwarded through aggregation access element 110, i.e., allowed to proceed over VC 135. Preferably, therefore, requiring policer 125 to wait for a drop message will not introduce any additional time into the amount of time that it takes for a packet to traverse aggregation access element 110.

Following step 645, in step 650, policer 125 determines whether it has received another packet to be processed for VC 135. If so, process 600 returns to step 620. Otherwise, process 600 ends after step 650.

In step 655, central controller 140 sends a refresh token message to policers 125 for VC 135. Central controller 140 calculates the number of tokens to be added at each refresh interval based on the CIR of the VC 135 and the refresh time interval. Alternatively, the number of tokens to be added at each refresh time interval may be predetermined and stored in central controller 140. In any event, at the end of each refresh interval, central controller 140 distributes the appropriate amount of tokens to each policer 125 associated with the VC 135 by sending a refresh token message.

In step 660, policer 125 forwards its packet to link buffer 126, which in turn sends the packet from aggregation access element 110 through VC 135.

Next, in step 665, policer 125 sends a message to central controller 140 indicating a number of tokens consumed by sending a packet in step 660.

Next, in step 670, central controller 140 decrements its count of tokens available for VC 135 based on the message received in step 665.

Next, in step 675, central controller 140 sends a message to each of the policers 125 for VC 135 updating the number of available tokens for the VC 135, and the policers 125 update their respective records of the number of available tokens for VC 135 accordingly.

Next, in step 680, controller 140 determines whether the end of a refresh interval has been reached. If not, process 600 proceeds directly to step 650. However, if the end of a refresh interval has been reached, process 600 proceeds to step 685.

In step 685, new tokens are distributed to policers 125, i.e., as described above with respect to step 655.

As noted above, process 600 may end following step 650.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided will be appreciated upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

We claim:

1. A system for dynamically assigning policers to links, comprising:
    an aggregation access element connected to a plurality of links;
    a plurality of policers;
    a central controller in selective communication with the aggregation access element, the central controller being configured to determine a manner in which two or more of the plurality of links are allocated to share traffic of a virtual connection, the central controller further configured to assign one policer to each such allocated link;
    wherein the central controller is further configured to provide tokens to each assigned policer, the total number of tokens provided to the assigned policers representing a committed information rate bandwidth allocated to the virtual connection, and
    wherein each assigned policer is configured to send a message to the central controller concerning a number of tokens consumed by the virtual connection over that link, and wherein the central controller is configured to keep a current status of the number of tokens for each of the plurality of links allocated to the virtual connection and distribute the current status to each of the assigned policers.

2. The system of claim 1, wherein the central controller is further configured to receive a first message from one of the plurality of policers concerning the status of a refresh interval, and to send a second message to the one policer concerning the number of tokens representing available bandwidth.

3. The system of claim 2, wherein each policer is configured to drop a packet if the second message is received from the central controller within a predetermined time, and to forward the packet if the second message is not received from the central controller within the predetermined time.

4. The system of claim 1, wherein the aggregation access element is connected to a packet switched network.

5. The system of claim 1, wherein the virtual connection includes a plurality of virtual connection flows that are each carried over a different one of the links.

6. The system of claim 1, wherein determining a manner in which traffic is allocated to the links is performed dynamically and includes at least one of using a signaling protocol to determine the manner and determining the manner according to a number of virtual connection identifiers detected within a predetermined period of time.

7. A method, comprising:
monitoring traffic flow in a plurality of links; and
based on the monitoring:
determining a manner in which traffic of a virtual connection is allocated to two or more of the links, and
assigning one policer each to the two or more links according to the manner in which traffic of the virtual connection is allocated to the links; and
receiving a message from each assigned policer concerning a number of tokens representing bandwidth used for the virtual connection;
monitoring a current status of the number of tokens used for the virtual connection; and
distributing the current status to each of the assigned policers.

8. The method of claim 7, further comprising:
receiving a first message from a policer concerning the status of a refresh interval, and
sending a second message to the policer concerning tokens representing available bandwidth.

9. The method of claim 8, further comprising:
dropping a packet if the second message is received from the central controller within a predetermined time, and
forwarding the packet if the second message is not received from the central controller within the predetermined time.

10. The method of claim 7, wherein the virtual connection includes a plurality of virtual connection flows that are each carried over a different one of the links.

11. The method of claim 7, wherein determining dynamically a manner in which traffic is allocated to the links is performed dynamically and includes at least one of using a signaling protocol to determine the manner and determining the manner according to a number of virtual connection identifiers detected within a predetermined period of time.

12. The method of claim 7, tangibly embodied as computer-executable instructions on a non-transitory computer-readable medium.

13. A system for dynamically assigning policers to links, comprising:
an aggregation access element connected to a plurality of links and to a packet switched network;
a virtual connection that is transported over at least two of the links;
a plurality of policers configured to send messages to a central controller concerning a number of tokens representing available bandwidth for transporting the virtual connection over the packet switched network and the status of a refresh interval; and
the central controller in selective communication with the policers, the central controller being configured to determine a manner in which the virtual connection is allocated to the links, to assign at least one of the policers according to the manner in which the virtual connection is allocated to the links, and to send a message to the policers concerning a number of tokens representing available bandwidth for transporting the virtual connection over the packet switched network, to keep a current status of the number of tokens, and distribute the current status to each of the plurality of policers.

14. The system of claim 13, wherein determining a manner in which traffic is allocated to the links is performed dynamically and includes at least one of using a signaling protocol to determine the manner and determining the manner according to a number of virtual connection identifiers detected within a predetermined period of time.

15. A system for dynamically assigning policers to links, comprising:
an aggregation access element connected to a plurality of links;
at least one policer in communication with each of the plurality of links; and
a central controller in selective communication with the aggregation access element, the central controller being configured to determine a manner in which traffic is allocated to the links and to assign the at least one policer according to the manner in which traffic is allocated to the links;
wherein the central controller is configured to provide tokens to the at least one policer, the tokens indicating whether sufficient bandwidth is available to allow traffic over at least one of the plurality of links,
wherein the at least one policer is configured to send a message to the central controller concerning a number of tokens representing available bandwidth consumed by the traffic allowed over each of the links, and wherein the central controller is configured to keep a current status of the number of tokens for each of the plurality of links and distribute the current status to each of the at least one policers,
wherein the central controller is further configured to receive a first message from the at least one policer concerning the status of a refresh interval, and to send a second message to the at least one policer concerning the number of tokens representing available bandwidth, and
wherein each policer is configured to drop a packet if the second message is received from the central controller within a predetermined time, and to forward the packet if the second message is not received from the central controller within the predetermined time.

16. A method, comprising:
monitoring traffic flow in a plurality of links; and
based on the monitoring:
determining a manner in which traffic is allocated to the links, and
assigning at least one policer according to the manner in which traffic is allocated to the links;

receiving a message from the at least one policer concerning a number of tokens representing available bandwidth;

monitoring a current status of the number of tokens;

distributing the current status to each of the at least one policers;

receiving a first message from the at least one policer concerning the status of a refresh interval;

sending a second message to the at least one policer concerning tokens representing available bandwidth;

dropping a packet if the second message is received from the central controller within a predetermined time; and forwarding the packet if the second message is not received from the central controller within the predetermined time.

* * * * *